Patented July 9, 1946

2,403,495

UNITED STATES PATENT OFFICE 2,403,495

INSECTICIDE

Charles Verne Bowen, Bethesda, Md., assignor to the United States of America, as represented by the Secretary of Agriculture No Drawing. Application February 10, 1942, Serial No. 430,247

2 Claims. (Cl. 167—30)

(Granted under the act of March 3, 1883, as amended April 30, 1928; 370 O. G. 757)

This application is made under the act of March 3, 1883, as amended by the act of April 30, 1928, and the invention herein described, if patented, may be manufactured and used by or for the Government for governmental purposes without the payment to me of any royalty thereon.

My invention relates to improvements in materials for destroying or checking the growth or multiplication of living organisms, whether plant or animal, which are economically injurious to man.

The principal object of my invention is to provide materials suitable for use as insecticides.

Another object of my invention is to provide materials which are relatively nontoxic to man and warm blooded animals when taken by mouth and which can be used in place of arsenicals and other dangerous chemicals for destroying insects without leaving a harmful residue on fruits and vegetables.

Another object of my invention is to provide synthetic organic insecticides which may replace insecticide materials (such as, pyrethrum, rotenone, and nicotine) that are obtained from certain plants and thus provide insecticides, the production of which is not influenced by climatic variations, growing conditions, localized production, and transportation.

I have found that organic compounds, which are known as substituted thiosemicarbazides, with the substitution occurring in the 1 and 4 positions, and which are represented by the formula given below, are toxic to insects.

It has been shown by Campbell, et al., Journal Economic Entomology 27, 1176 (1934), that the compound thiosemicarbazide is toxic to the culicine mosquito larvae. These 1,4-substituted thiosemicarbazides resemble thiosemicarbazide in name and part of their structure, but they are different in total composition and reactions. Thiosemicarbazide is water-soluble and reacts with aldehydes and ketones, with the elimination of water and the formation of thiosemicarbazones. The 1,4-substituted thiosemicarbazides, which I have found to be toxic, are water-insoluble and due to a substitution already present in the 1 position can not react with aldehydes and ketones with the elimination of water. Consequently, the compounds claimed in this application are not to be confused with thiosemicarbazide. On the other hand, the solubility of thiosemicarbazide in water renders it impractical under many circumstances for use as an insecticide. The use of 1,4-substituted thiosemicarbazides overcomes this difficulty, since due to their relative insolubility they will not be removed by dissolving in atmospheric moisture from the surface to which they have been applied.

In addition a water-soluble insecticide material will only produce a layer after evaporation of the liquid spray medium commensurate with the solubility of the insecticide and the amount of spray material necessary to completely wet the desired surface. An insoluble material, however, will give a layer on evaporation of the liquid medium commensurate with the amount of suspended matter present when the sprayed surface is thoroughly wet. Since it is possible to have a much larger amount of suspended material present in a unit volume than of dissolved material in the same volume, it is evident that an insoluble material, as the 1,4-substituted thiosemicarbazides, can be applied to a desired surface, in a much larger amount than a water-soluble material, as thiosemicarbazide, to the same surface.

This class of compounds is represented by the general formula,

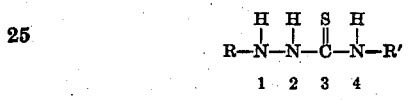

in which R (the 1 substituent) is an aryl radical and R' (the 4 substituent) represents a member of the group consisting of hydrogen, an alkyl radical, an aryl radical, and a condensed aromatic nucleus.

The effectiveness as insecticides of substituted thiosemicarbazides of this type is shown by the following experimental results.

EXAMPLE I 1-phenylthiosemicarbazide

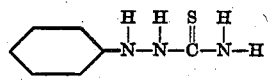

(1) When tested against screw worm larvae (*Cochliomya americana*), the minimum lethal dose of this compound was found to be less than 0.025 percent.

(2) When tested as a dust, this compound gave a 92 percent kill of the fifth instar of the Hawaiian beet webworm in 48 hours, while derris at practically the same concentration gave only an 80 percent kill of the same insect in the same time. The test compound gave a kill of 96 percent in 72 hours.

(3) When tested as a spray, this compound gave slightly higher kill of the fifth instar of the Hawaiian beet webworm than a derris suspension of the same concentration in four days.

(4) When tested as a dust this compound gave a 10 percent greater kill of the fifth instar of the southern beet webworm than lead arsenate in the same time and practically the same concentration.

EXAMPLE II

1,4-diphenylthiosemicarbazide

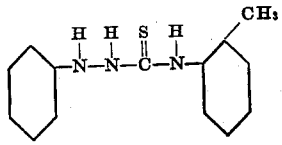

(1) When tested as a dust, this compound gave an 82 percent kill of the fifth instar of the Hawaiian beet webworm.

(2) At a concentration of 4 pounds per hundred gallons, this compound gave an 84.8 percent kill of European corn borer larvae in 72 hours. At a concentration of 2 pounds per hundred gallons the kill was 82.1 percent in 72 hours.

(3) When tested against the furniture carpet beetle (Anthrenus vorax), this compound was twice as effective as sodium silicofluoride.

EXAMPLE III

1-phenyl-4-o-tolylthiosemicarbazide

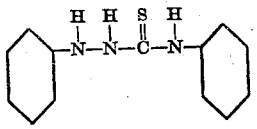

(1) When tested as a dust, this compound gave an 80 percent kill of the fifth instar of the Hawaiian beet webworm in 48 hours. Derris gave the same kill of the same insect in the same time at practically the same concentration. The test compound gave a kill of 92 per cent of this insect in 72 hours.

(2) At a concentration of 4 pounds per hundred gallons, this compound gave a 97.3 percent kill of European corn borer larvae in 72 hours. At a concentration of 2 pounds per hundred gallons the kill was 77 percent in 72 hours.

(3) When tested as a dust, this compound gave a 83 percent kill of the fourth instar of the southern army worm in 72 hours.

(4) When tested against the furniture carpet beetle (Anthrenus vorax), this compound was one and a half times as effective as sodium silicofluoride.

(5) When tested as a dust, this compound gave a greater kill of the fifth instar of the southern beet webworm in three days than lead arsenate at practically the same concentration in the same time.

(6) When tested as a spray, this compound gave a 96 percent kill of the fifth instar of the southern beet webworm, while lead arsenate gave only an 80 percent kill of the same insect in the same time.

EXAMPLE IV

1-(2,4-dinitrophenyl)-4-methylthiosemicarbazide

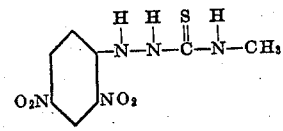

(1) When tested as a dust, this compound gave a 77 percent kill of the fifth instar of the Hawaiian beet webworm in 72 hours.

(2) This compound at a concentration of 100 parts per million gave a 96 percent kill of mosquito larvae (Culex quinquefasciatus).

EXAMPLE V

4-alpha-naphthyl-1-phenylthiosemicarbazide

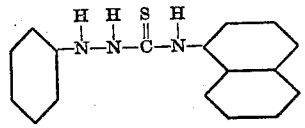

When tested as a dust, this compound gave a 53 percent kill of the fifth instar of the cross-striped cabbage worm in 72 hours.

Other 1,4-thiosemicarbazides also showed toxicity to insects, among these were the 1-tolyl substituted compounds, as 4-alpha-naphthyl-1-p-tolylthiosemicarbazide.

It is to be understood that the above compounds used in describing entomological results are given merely as examples and that this invention is not to be restricted by such use.

These materials may be reduced to impalpable powders by grinding and applied to vegetation either as a dust, alone or with an inert carrier, or made into a suspension and used as a spray. When applied as a spray in a liquid medium, it may be desirable to incorporate certain conditioners, such as dispersing agents, wetting agents, stickers and spreaders. The spray may be made by mechanically suspending the impalpable powder in the liquid medium or by first dissolving it in an appropriate solvent, such as acetone, and then pouring the resulting solution into water, whereupon a fine colloidal suspension is obtained. This may be applied directly to the host plant or may be combined with suitable conditioners and then sprayed. Certain of these compounds are soluble in oil, consequently may be applied as components of an oil emulsion spray.

For the control of certain types of insects, it may be advantageous to admix any one of this class of compounds with known insecticides, such as pyrethrum, derris, the arsenicals, phenothiazine and so forth.

Having thus described my invention, what I claim for Letters Patent is:

1. A method for controlling insects comprising applying 1,4-diphenylthiosemicarbazide to the habitat of the insects.

2. A method for controlling insects comprising dusting the habitat of the insects with an insecticidal material resistant to the reaction of atmospheric moisture, said material comprising 1,4-diphenylthiosemicarbazide.

CHARLES VERNE BOWEN.